US006327225B1

(12) United States Patent
Okeya et al.

(10) Patent No.: US 6,327,225 B1
(45) Date of Patent: Dec. 4, 2001

(54) ELECTRONIC UNIT, AND CONTROL METHOD FOR ELECTRONIC UNIT

(75) Inventors: Makoto Okeya; Noriaki Shimura; Joji Kitahara, all of Shiojiri; Hiroyuki Kojima, Matsumoto; Hiroshi Yabe, Shiojiri, all of (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/622,194

(22) PCT Filed: Dec. 14, 1999

(86) PCT No.: PCT/JP99/07001

§ 371 Date: Aug. 11, 2000

§ 102(e) Date: Aug. 11, 2000

(87) PCT Pub. No.: WO00/36474

PCT Pub. Date: Jun. 22, 2000

(30) Foreign Application Priority Data

Dec. 14, 1998 (JP) .............................................. P10-355246

(51) Int. Cl.[7] ................................ G04F 5/00; G06F 1/04; G04B 1/00; H02P 8/00

(52) U.S. Cl. ........................... 368/157; 368/204; 318/696

(58) Field of Search ............................... 368/11, 80, 157, 368/160, 203–204; 318/696

(56) References Cited

U.S. PATENT DOCUMENTS 4,321,519 * 3/1982 Ueda et al. .......................... 318/696
4,321,520 * 3/1982 Ueda et al. .......................... 318/696

FOREIGN PATENT DOCUMENTS

| | | |
|---|---|---|
| 0 859 294 | 8/1998 | (EP) . |
| 57-26776 | 2/1982 | (JP) . |
| 59-195182 | 11/1984 | (JP) . |
| 61-202186 | 9/1986 | (JP) . |
| 62-195583 | 8/1987 | (JP) . |
| 64-12349 | 2/1989 | (JP) . |
| 8-278380 | 10/1996 | (JP) . |
| 9-101380 | 4/1997 | (JP) . |
| 9-105786 | 4/1997 | (JP) . |
| 9-90063 | 4/1997 | (JP) . |

* cited by examiner

*Primary Examiner*—Vit Miska
(74) *Attorney, Agent, or Firm*—Michael T. Gabrik

(57) ABSTRACT

In an electronic unit having a plurality of motors, a reduction in power-supply voltage is suppressed even if the plurality of motors are driven, and a difference in hand moving timing is allowed to be made inconspicuous. An electronic timepiece having a seconds motor for driving a seconds hand and an hour-and-minute motor for driving hour and minute hands, which serves as an electronic unit, moves the seconds hand and the hour and minute hands such that, when a seconds auxiliary pulse signal is output to the seconds motor at the hand moving timing of the seconds hand, control is applied in a way in which neither magnetic-field detection around the hour-and-minute motor nor the rotation detection of the hour-and-minute motor is performed at the hand moving timing of the hour and minute hands, and an hour-and-minute auxiliary pulse signal is output to the hour-and-minute motor.

19 Claims, 9 Drawing Sheets

ELECTRONIC UNIT, AND CONTROL METHOD FOR ELECTRONIC UNIT

TECHNICAL FIELD

The present invention relates to electronic units having a plurality of motors and to control methods for electronic units.

BACKGROUND ART

Recently, there have been known compact analog timepieces, such as watches, provided with only one motor and a hand moving mechanism for simultaneously moving a seconds hand, a minute hand, and an hour hand according to the driving timing of the motor and those provided with a plurality of motors so that a seconds hand and minute and hour hands, or a seconds hand, a minute hand, and an hour hand are separately driven according to the driving timings of the motors.

Analog timepieces which drive three hands by one motor are inferior in terms of flexibility in driving control to analog timepieces which drive hands by a plurality of motors because they have to drive all the three hands by one motor.

When a seconds-hand moving mechanism and an hour-and-minute-hand moving mechanism are independently driven by two motors, hand-moving timings match the driving timings of the motors. Therefore, if the seconds-hand and the hour-and-minute-hand moving timings are the same, a seconds motor and an hour-and-minute motor are driven at the same time. A current load for driving the motors occur at that time and a problem arises in that a power-supply voltage is reduced.

To prevent the power-supply voltage from decreasing, it can be considered that different intervals are used for the driving timings of the seconds motor and the hour-and-minute motor. In this case, a problem occurs in that a difference between the hand-moving timings for the seconds hand and the hour and minute hands becomes conspicuous to the user.

The above-discussed problems will be specifically described below.

FIG. 11 shows the structure of a general driving control system in a time measuring apparatus, which is a prerequisite for the following description.

As shown in FIG. 11, a driving control circuit 24 generates a driving-pulse control signal, and sends the generated driving-pulse control signal to an hour-and-minute driving circuit 30*m* and to a seconds driving circuit 30*s*. The hour-and-minute driving circuit 30*m* and the seconds driving circuit 30*s* send an hour-and-minute driving-pulse signal to an hour-and-minute motor 10*m* and a seconds driving-pulse signal to a seconds motor 10*s*, respectively, according to the driving-pulse control signal sent from the driving control circuit 24.

The hour-and-minute motor 10*m* and the seconds motor 10*s* drive the hour-and-minute motor 10*m* and the seconds motor 10*s* to move hands by the hour-and-minute driving-pulse signal and the seconds driving-pulse signal sent from the hour-and-minute driving circuit 30*m* and the seconds driving circuit 30*s*, respectively.

The driving control circuit 24 is also provided with a function for detecting the rotations of the hour-and-minute motor 10*m* and the seconds motor 10*s* according to induced voltages generated at driving coils not shown by the rotations of the motors, and a function for detecting magnetic fields around the hour-and-minute motor 10*m* and the seconds motor 10*s* according to induced voltages generated at the driving coils not shown by the surrounding magnetic fields.

The driving control circuit 24 determines with the use of the above-described rotation detection function whether the hour-and-minute motor 10*m* and the seconds motor 10*s* correctly rotate by the hour-and-minute driving-pulse signal, and also determines with the use of the magnetic-field detection function whether an external magnetic field which affects the normal functioning of the rotation detection function exists around the hour-and-minute motor 10*m* and the seconds motor 10*s*.

A detailed description will be given by referring to FIG. 10.

When the seconds hand and the hour and minute hands are driven by the motors in that order, for example, the driving control circuit 24 outputs the seconds driving-pulse signal K1*s*6 to the seconds driving circuit 30*s* to drive the seconds hand as shown by the pulse timing O*s*6 in FIG. 10.

After outputting the seconds driving-pulse signal K1*s*6, the driving control circuit 24 outputs a seconds rotation-detection-pulse signal SP2*s*6 used for checking whether the seconds hand has correctly rotated.

If a correct rotation is not detected by the use of the seconds rotation-detection-pulse signal SP2*s*6, the driving control circuit 24 outputs a seconds auxiliary pulse signal P2*s*6 used for positively driving the seconds hand, which is larger in effective electric power than the seconds driving-pulse signal K1*s*6, to drive the seconds motor 10*s*.

As shown by the pulse timing O*m*6 in FIG. 10, the driving control circuit 24 outputs an hour-and-minute driving-pulse signal K1*m*6 to the hour-and-minute driving circuit 30*m* to drive the hour and minute hands.

The period of time T61 shown in FIG. 10 indicates the maximum period between the seconds-hand moving timing and the hour-and-minute-hand moving timing. If the period of time T61 is long, the difference between the seconds-hand moving timing and the hour-and-minute-hand moving timing becomes conspicuous to the user.

The period of time T62 shown in FIG. 10 indicates the minimum period between the seconds-hand moving timing and the hour-and-minute-hand moving timing. If the period of time T62 is short and current loads caused by the driving of the hour-and-minute motor 10*m* and the seconds motor 10*s*, which drive the hour and minute hands and the seconds hand, overlap, the power-supply voltage is reduced and in some cases, incorrect hand movement may be performed.

When the seconds hand and the hour and minute hands are driven with the period of time T61 being set such that the difference between the seconds-hand moving timing and the hour-and-minute-hand moving timing does not become conspicuous to the user, it is understood from the above description that the period T62 becomes too short and a problem arises in that the hour-and-minute driving-pulse signal K1*m*6 is output before the power-supply voltage has recovered from a reduced voltage caused by the output of the seconds auxiliary pulse signal P2*s*6 after the seconds auxiliary pulse signal P2*s*6 has been output.

OBJECT OF INVENTION

The present invention has been made in consideration of the above situation.

Accordingly, an object of the present invention is to provide an electronic unit and a control method for an electronic unit which suppress a reduction in power-supply voltage even if a plurality of motors are driven, and which allow a difference in hand moving timing to be made inconspicuous.

DISCLOSURE OF INVENTION

In a first mode of the present invention, an electronic gear for driving a plurality of motors by the use of electric power supplied from a power supply is characterized by comprising a magnetic-field detection unit for detecting an external magnetic field around the motors; a rotation detection unit for detecting the rotations of the motors; an output-timing control unit for controlling the output timings of driving pulses for driving the motors, according to at least one of the detection results obtained by the magnetic-field detection unit and the rotation detection unit, and for controlling such that, in a state in which a power-supply voltage is recovered from a reduced voltage caused by the output of a first driving-pulse signal for driving a first motor, which is one of the motors, a seconds driving-pulse signal for driving a seconds motor, which is another motor, is output within a predetermined period of time, determined in advance, after the output of the first driving-pulse signal; and a driving-pulse output unit for outputting the driving-pulse signals to the motors under the control of the output-timing control unit.

A second mode of the present invention is characterized in that, in the first mode, the output-timing control unit is provided with an auxiliary-driving-pulse-signal output control unit for controlling such that, when the rotation detection unit does not drive the motors by the use of usual driving-pulse signals, an auxiliary driving-pulse signal which is larger in effective power than the usual driving-pulse signals is output to the motors through the driving-pulse output unit.

A third mode of the present invention is characterized in that, in the first mode, the output-timing control unit includes a motor-rotation-detection disabling unit for disabling the detection operation of the rotation detection unit when the magnetic-field detection control unit detects an external magnetic field which affects the motor-rotation detection of the rotation detection unit, and an auxiliary-driving-pulse-signal output control unit for controlling such that, when the detection operation of the rotation detection unit is disabled, an auxiliary driving-pulse signal which is larger in effective power than the usual driving-pulse signals is output to the motors through the driving-pulse output unit.

A fourth mode of the present invention is characterized in that, in the first to third modes, the output-timing control unit uses the detection result obtained by the rotation detection unit, corresponding to one of the plurality of motors, as an output-timing control signal for another motor.

A fifth mode of the present invention is characterized in that, in the first to third modes, the output-timing control unit uses the detection result obtained by the magnetic-field detection unit, corresponding to one of the plurality of motors, as an output-timing control signal for another motor.

A sixth mode of the present invention is characterized in that, in the fifth mode, the plurality of motors are arranged such that the effects thereon due to the external magnetic field can be regarded as equivalent.

A seventh mode of the present invention is characterized in that, in the sixth mode, the plurality of motors are arranged at positions parallel to each other.

An eight mode of the present invention is characterized in that, in the sixth mode, the plurality of motors are arranged at positions within ±60 degrees of each other when positions where the plurality of motors are disposed parallel to each other is set to ±0 degrees.

A ninth mode of the present invention is characterized in that, in the first mode, an electricity accumulating unit for accumulating electric power and an electric-power consuming unit for operating by the use of the electric power supplied from the electricity accumulating unit are provided, and the electric-power consuming unit comprises a time indication unit for allowing the time to be indicated by the use of electric power supplied from the electricity accumulating unit.

A tenth mode of the present invention is characterized in that, in the ninth mode, the plurality of motors drive hands, and the predetermined period of time is specified as a same-timing-recognition allowing period in which the user recognizes that the hands corresponding to continuously driven motors among the plurality of motors move with almost the same timing.

An eleventh mode of the present invention is characterized in that, in the tenth mode, the same-timing-recognition allowing period is set to 100 msec or less.

A twelfth mode of the present invention is characterized in that, in the first mode, the state in which the power-supply voltage is recovered from a reduced voltage unit means a voltage state in which the motors can be driven.

In a thirteenth mode of the present invention, a control method for an electronic gear for driving a plurality of motors according to electric power supplied from a power supply is characterized by comprising a magnetic-field detection step of detecting an external magnetic field around the motors; a rotation detection step of detecting the rotations of the motors; an output-timing control step of controlling the output timings of driving pulses for driving the motors, according to at least one of the detection results obtained in the magnetic-field detection step and the rotation detection step, and of controlling such that, in a state in which a power-supply voltage is recovered from a reduced voltage caused by the output of a first driving-pulse signal for driving a first motor, which is one of the motors, a seconds driving-pulse signal for driving a seconds motor, which is another motor, is output within a predetermined period of time, determined in advance, after the output of the first driving-pulse signal; and a driving-pulse output step of outputting the driving-pulse signals to the motors under the control in the output-timing control step.

BEST MODE FOR CARRYING OUT THE INVENTION

Figure 1:
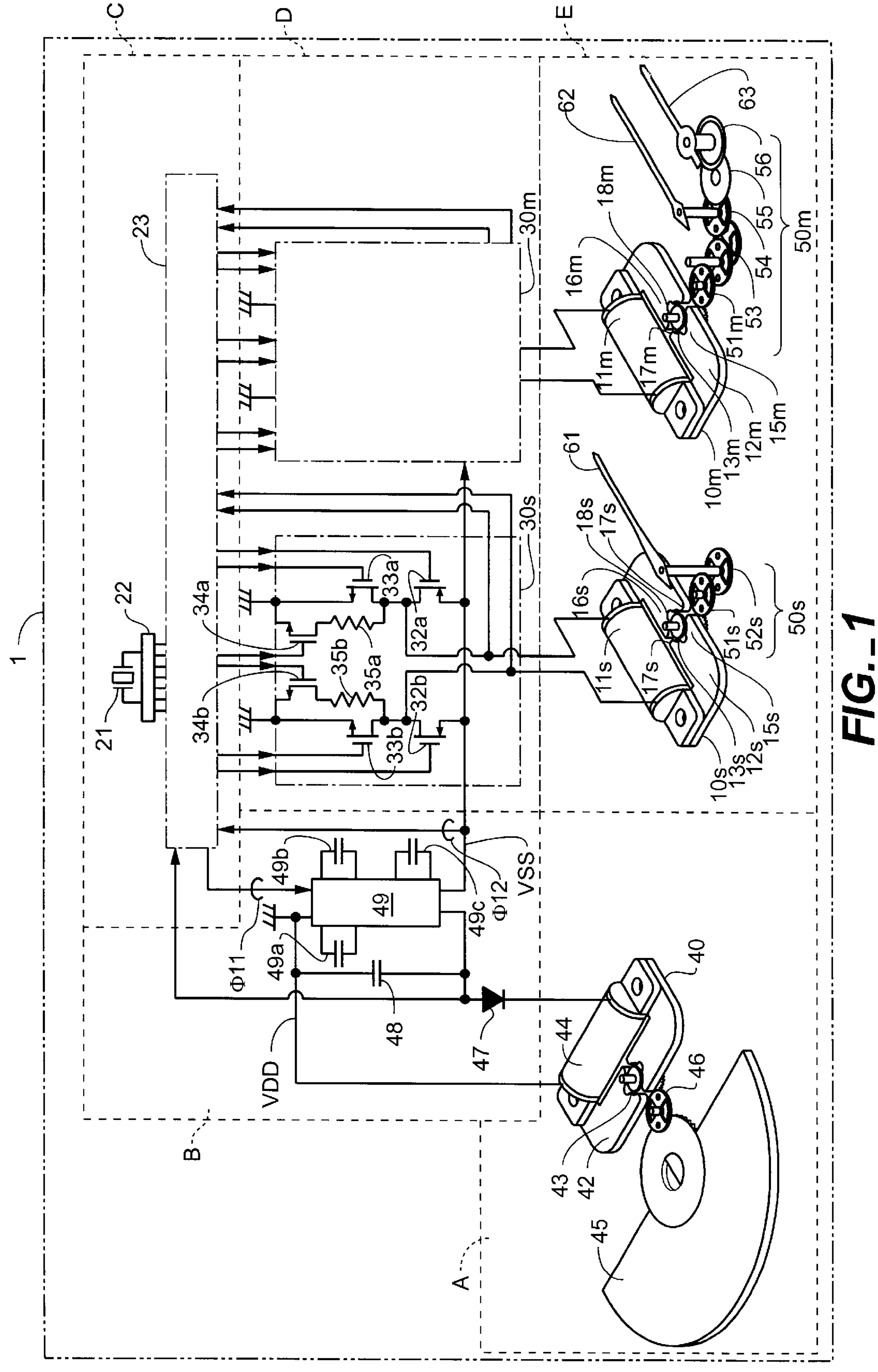
FIG. 1 is a view showing a general structure of a time measuring apparatus according to an embodiment of the present invention.

Embodiments of the present invention will be described below by referring to the drawings.

[1] First Embodiment

[1.1] Whole structure

A first embodiment of the present invention will be described below by referring to drawings.

FIG. 1 shows a general structure of a time measuring apparatus serving as an electronic unit according to an embodiment of the present invention. This time measuring apparatus 1 is a watch. The user wears it by strapping a band connected to the body of the apparatus on their wrist.

The time measuring apparatus 1 according to the present embodiment is generally provided with a power generating section A for generating alternating current electric power, a power supply section B for rectifying the alternating voltage sent from the power generating section A, for accumulating a boosted voltage, and for supplying electric power to each section, a control section C for detecting the power generating state of the power generating section A and for controlling the entire apparatus according to the result of the detection, a hand moving mechanism E for driving hands by the use of an hour-and-minute motor 10*m* and a seconds motor 10*s*, and a driving section D for driving the hand moving mechanism E according to a control signal sent from the control section C.

Each section will be described below.

[1.1.1] Structure of the power generating section A

The power generating section A includes a power generating apparatus 40, an oscillating weight 45, and an accelerating gear 46.

As the power generating apparatus 40, an electromagnetic-induction-type alternating current power generating apparatus is employed, in which a power generating rotor 43 rotates inside a power generating stator 42 and electric power induced in a power generating coil 44 connected to the power generating stator 42 can be output to the outside.

The oscillating weight 45 functions as means for transferring kinetic energy to the power generating rotor 43. The movement of the oscillating weight 45 is transferred to the power generating rotor 43 through the accelerating gear 46.

This oscillating weight 45 can swivel in the wrist watch-type time measuring apparatus 1 by using the movement of the user's arm. Therefore, electric power is generated by the use of energy related to the user's daily life and the time measuring apparatus 1 is driven by the electric power.

[1.1.2] Structure of the power supply section

The power supply section B includes a diode 47 serving as a rectifying circuit, a large-capacitance capacitor 48, and a buck-boost converter circuit 49.

The buck-boost converter circuit 49 can provide multi-stage boosting and voltage reduction by the use of a plurality of capacitors 49*a*, 49*b*, and 49*c*, and can adjust a voltage sent to the driving section D by a control signal $\phi$11 sent from the control section C. The output voltage of the buck-boost converter circuit 49 is also sent to the control section C as a monitor signal $\phi$12, and the control section C thereby monitors the output voltage.

The power supply section B uses Vdd (higher voltage) as a reference potential (GND) and generates Vss (lower voltage) as a power-supply voltage.

[1.1.3] Structure of the hand moving mechanism

The hand moving mechanism E will be described next.

The hand moving mechanism E includes the seconds motor 10*s* for driving a seconds hand 61 and the hour-and-minute motor 10*m* for driving a minute hand 62 and an hour hand 63.

The hour-and-minute motor 10*m* and the seconds motor 10*s*, used in the hand moving mechanism E, which are also called pulse motors, stepper motors, step-movement motors, or digital motors, are used as actuators for digital control apparatuses in many cases, and are driven by pulse signals. In recent years, compact, lightweight stepper motors have been employed in many cases as actuators for portable, compact electronic apparatuses or information units. Time measuring apparatuses, such as electronic timepieces, time switches, and chronographs, are representatives of such electronic apparatuses.

The hour-and-minute motor 10*m* and the seconds motor 10*s* according to the present embodiment include driving coils 11*m* and 11*s* for generating magnetic power by driving pulses sent from the driving section D, stators 12*m* and 12*s* energized by the driving coils 11*m* and 11*s*, and rotors 13*m* and 13*s* rotated by magnetic fields energized inside the stators 12*m* and 12*s*.

In the hour-and-minute motor 10*m* and the seconds motor 10*s*, the rotors 13*m* and 13*s* are of the PM type (permanent-magnet rotation type) formed of disc shaped, two-pole permanent magnets.

The stators 12*m* and 12*s* are provided with magnetic saturation sections 17*m* and 17*s* such that different magnetic poles are generated at phases (poles) 15*m* and 15*s* or 16*m* and 16*s* around the rotors 13*m* and 13*s* by the magnetic power generated by the driving coils 11*m* and 11*s*.

To specify the rotation directions of the rotors 13*m* and 13*s*, inside notches 18*m* and 18*s* are provided at appropriate positions of the inner peripheries of the stators 12*m* and 12*s*. The rotors 13*m* and 13*s* are stopped at appropriate positions by generated cogging torque.

The rotation of the rotor 13*m* of the hour-and-minute motor 10*m* is transferred to the hour hand and to the minute hand through an hour-and-minute wheel train 50*m* formed of a second wheel 51*m* engaged with the rotor 13*m* through a pinion, a third wheel 53, a center wheel 54, a minute wheel 55, and an hour wheel 56. The center wheel 54 is connected to the minute hand 62, and the hour wheel 56 is connected to the hour hand 63.

The rotation of the rotor 13*s* of the seconds motor 10*s* is transferred to the seconds hand through a seconds wheel train 50*s* formed of an intermediate seconds wheel 51*s* engaged with the rotor 13*s* through a pinion and a seconds wheel 52. The shaft of the seconds wheel 52 is connected to the seconds hand 61.

The time is indicated by these hands moved by the rotation of the rotors 13*m* and 13*s*.

[1.1.4] Structure of the driving section

The driving section D sends various driving pulses to the hour-and-minute motor 10*m* and to the seconds motor 10*s* under the control of the control section C. The driving section D is provided with a seconds driving circuit 30*s* and an hour-and-minute driving circuit 30*m*.

The seconds driving circuit 30*s* includes a bridge circuit formed of a p-channel MOS transistor 33*a* and an n-channel MOS transistor 32*a* connected in series, and a p-channel MOS transistor 33*b* and an n-channel MOS transistor 32*b*.

The seconds driving circuit 30*s* is also provided with rotation-detection resistors 35*a* and 35*b* connected in parallel to the p-channel MOS transistors 33*a* and 33*b*, and sampling p-channel MOS transistors 34*a* and 34*b* for sending chopper pulses to the resistors 35*a* and 35*b*.

Therefore, when the control section C applies control pulses having different polarities and pulse widths to the gate electrodes of the MOS transistors 32*a*, 32*b*, 33*a*, 33*b*, 34*a*, and 34*b*, driving pulses having different polarities can be sent to the driving coil 11*s*, or a detection pulse signal for exciting an induced voltage used for detecting the rotation and the magnetic field of the rotor 13*s* can be sent.

The hour-and-minute driving circuit 30*m* has the same structure as the seconds driving circuit 30*s*.

Therefore, when the control section C applies control pulses having different polarities and pulse widths to gate electrodes in the driving circuit 30*m*, driving pulses having different polarities can be sent to the driving coil 11*s*, or a detection pulse signal for exciting an induced voltage used for detecting the rotation and the magnetic field of the rotor 13*m* can be sent.

[1.1.5] Structure of the control section

Figure 2:
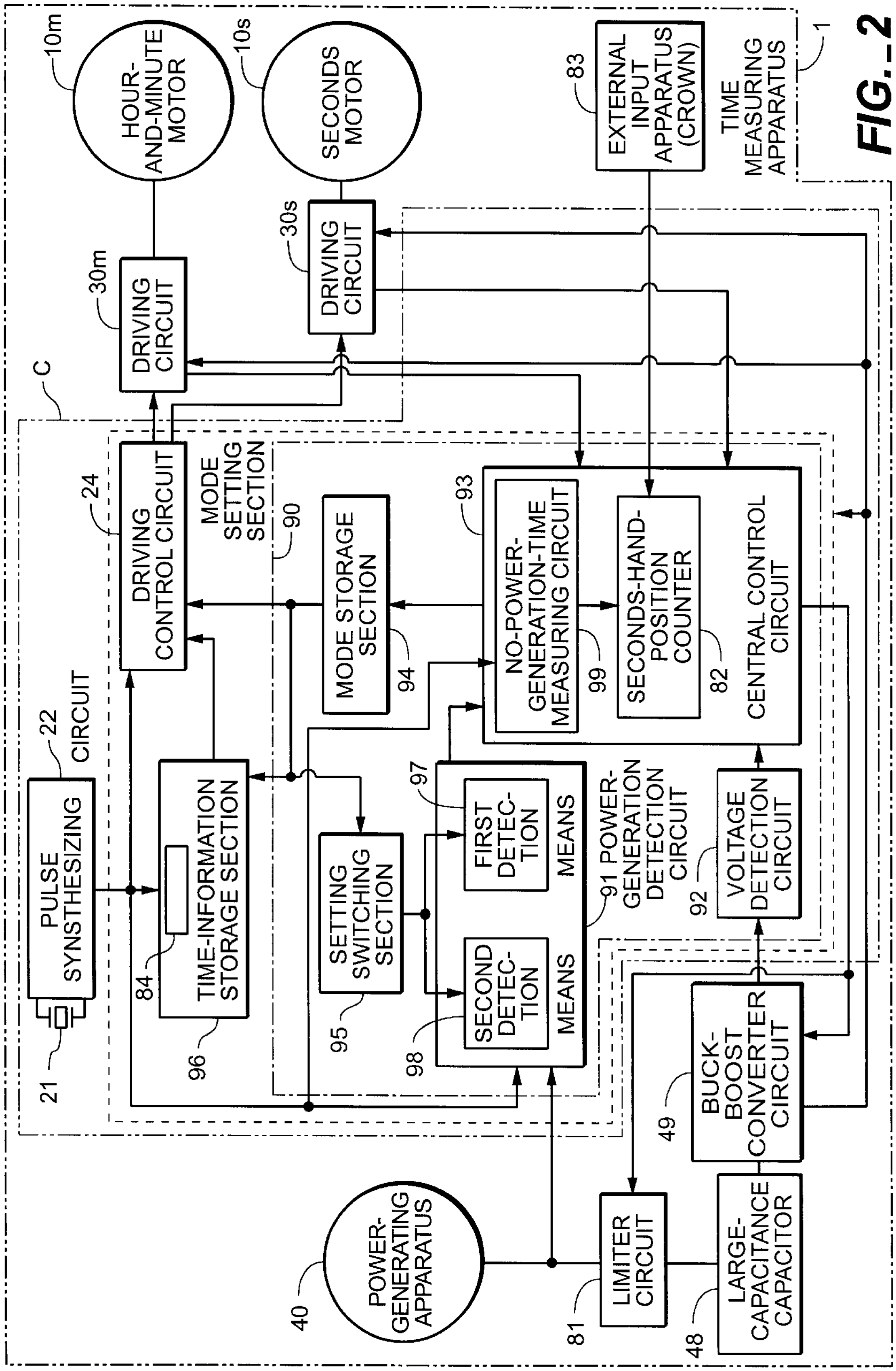
FIG. 2 is a functional block diagram of a control apparatus of the time measuring apparatus according to the embodiment and its surrounding structure.

The structure of the control section C will be described below by referring to FIG. 2. FIG. 2 is a functional block diagram of the control section C of the time measuring apparatus 1 according to an embodiment of the present invention and its surrounding structure.

The control section C generally includes a pulse synthesizing circuit 22, a mode setting section 90, a time-information storage section 96, and a driving control circuit 24.

[1.1.5.1] Structure of the pulse synthesizing circuit

The pulse synthesizing circuit 22 will be described first.

The pulse synthesizing circuit 22 includes an oscillation circuit for oscillating reference pulses having a stable frequency by the use of a reference oscillation source 21, such as a crystal oscillator, and a synthesizing circuit for synthesizing reference pulses with scaled-down pulses obtained by scaling the reference pulses to generate pulse signals having different pulse widths and timings.

[1.1.5.2] Structure of the mode setting section

The mode setting section 90 will be described next.

The mode setting section 90 generally includes a power-generation detection circuit 91, a setting switching section 95 for switching a setting used for detecting a power-generation state, a voltage detection circuit 92 for detecting the accumulated voltage Vc of the large-capacitance capacitor 48, a central control circuit 93 for controlling the time-indication mode according to the power-generation state and for controlling a boost magnification according to the accumulated voltage, and a mode storage section 94 for storing the mode.

[1.1.5.2.1] Structure of the power-generation detection circuit

The power-generation detection circuit 91 is provided with a first detection circuit 97 for determining whether power generation is detected by comparing an electromotive force Vgen of the power-generation apparatus 40 and a set voltage Vo, and a second detection circuit 98 for determining whether power generation is detected by comparing a set time To with a power-generation duration Tgen in which the electromotive force Vgen equal to or greater than a set voltage Vbas much smaller than the set voltage Vo is obtained.

When at least one of the conditions corresponding to the first detection circuit 97 and the seconds detection circuit 98 is satisfied, it is determined that the state is a power-generation state.

The set voltages Vo and Vbas are negative voltages against Vdd (=GND), and show the potential differences from Vdd.

[1.1.5.2.2] Structure of the setting switching section

The setting switching section 95 can apply switching control to the set voltage Vo and to the set time To. When the mode is changed from a display mode to a power-saving mode, the setting switching section 95 changes the set value Vo for the first detection circuit 97 and the set value To for the seconds detection circuit 98 of the power-generation circuit 91.

[1.1.5.2.3] Structure of the central control circuit

The central control circuit 93 includes a no-power-generation-time measuring circuit 99 for measuring a no-power-generation time Tn for which neither the first detection circuit 97 nor the seconds detection circuit 98 detects power generation, and a seconds-hand-position counter 82 having a cyclic period of 60 seconds. When the no-power-generation time Tn exceeds a predetermined set time, the no-power-generation-time measuring circuit 99 changes the display mode to the power-saving mode.

On the other hand, the power-saving mode is changed to the display mode when the power-generation detection circuit 91 determines that the power generation apparatus 40 is in a power-generation state, and when the voltage detection circuit 92 determines that the accumulated voltage VC of the large-capacitance capacitor 48 is sufficient.

The seconds-hand-position counter 82 is a counter having a cyclic period of 60 seconds. In an analog timepiece, for example, hand movement continues until the seconds-hand-position counter 82 has a count of 0 (corresponding to the position of 12 o'clock, for example). When the seconds-hand-position counter 82 shows 0, the time indication operation is stopped and the display mode is changed to the power-saving mode.

This is because the timepiece itself cannot determine where the hand is currently positioned. The position of the hand obtained when the mode is returned to the display mode is determined relative to the position of the hand obtained when the seconds-hand-position counter 82 has a count of 0.

[1.1.5.2.4] Structure of the mode storage section

The mode storage section 94 stores a set mode, and sends the information thereof to the driving control circuit 24, to the time-information storage section 96, and to the setting switching section 95. When the display mode is changed to the power-saving mode, the driving control circuit 24 stops sending pulse signals to the driving circuits 30*m* and 30*s* to stop the operations of the driving circuits 30*m* and 30*s*. With these operations, driving of the hour-and-minute motor 10*m* and the seconds motor 10*s* is stopped, the hour-and-minute hands and the seconds hand are in a non-driven state, and time indication is stopped.

[1.1.5.2.3] Structure of the time-information storage section

The time-information storage section 96 will be described next.

The time-information storage section 96 includes a power-saving-mode counter 84. When the display mode is changed to the power-saving mode, the power-saving-mode counter 84 receives a reference signal generated by the pulse synthesizing circuit 22 and starts counting the value corresponding to an elapsed time. When the power-saving mode is changed to the display mode, it stops counting the value corresponding to the elapsed time. With these operations, the value corresponding to the duration of the power-saving mode is counted. The power-saving-mode counter 84 stores the value corresponding to the duration of the power-saving mode.

When the power-saving mode is changed to the display mode, the power-saving-mode counter 84 counts fast-feed pulses sent from the driving control circuit 24 to the driving circuits 30*m* and 30*s*. When the count reaches the value corresponding to the power-saving-mode counter 84, it generates a control signal to stop sending the fast-feed pulses and sends it to the driving circuits 30*m* and 30*s*.

Therefore, the time-information storage section 96 is also provided with a function for returning the re-displayed time indication back to the current time.

The contents of the power-saving-mode counter 84 are reset when the display mode is changed to the power-saving mode, when an external input apparatus 83 is set to a time correction mode (an operation element (such as a crown) is set to a position where time adjustment is manually performed by operating the operation element), or when the time correction mode is released.

[1.1.5.4] Structure of the driving control circuit

The driving control circuit 24 will be described next.

The driving control circuit 24 generates the driving pulse signal corresponding to a mode controlled by a mode control section 24A, according to various pulse signals output from the pulse synthesizing circuit 22. In the power-saving mode, sending of the driving pulse signal is stopped. Immediately after the power-saving mode is changed to the display mode, to return the re-displayed time indication back to the current time, the fast-feed pulses having a short pulse interval are sent to the driving circuits 30*m* and 30*s* as a driving pulse signal. When sending of the fast-feed pulses is finished, a driving pulse signal having a normal pulse interval is sent to the driving circuits 30*m* and 30*s*.

The driving control circuit 24 is also provided with a function for detecting the rotations of the hour-and-minute motor 10*m* and the seconds motor 10*s*.

More specifically, after the driving pulse signal for rotating the hour-and-minute motor 10*m* and the seconds motor 10*s* is output, the levels of the voltages induced across the driving coils 11*m* and 11*s* are detected to determine whether the hour-and-minute motor 10*m* and the seconds motor 10*s* correctly rotate. When the detected levels exceed the constant voltage levels corresponding to motor rotations determined in advance, it is determined that the voltages induced across the driving coils 11*m* and 11*s* are those induced by the rotations of the hour-and-minute motor 10*m* and the seconds motor 10*s*, and the rotations are thus detected.

If the voltages corresponding to the motor rotations are not detected, it is determined that the motors are not rotating. Auxiliary pulse signals having a large effective power are output in order to positively rotate the hour-and-minute motor 10*m* and the seconds motor 10*s*.

The driving control circuit 24 is also provided with a function for detecting magnetic fields around the driving coils 11*m* and 11*s* by induced voltages caused by external magnetic fields generated in the driving coils 11*m* and 11*s*. It is determined whether an external magnetic field which affects the above-described rotation detection exists.

This is to prevent the driving control circuit 24 from erroneously determining that voltages generated by an external magnetic field are those induced at the driving coils 11*m* and 11*s* due to the rotations of the driving coils 11*m* and 11*s* when the driving coils 11*m* and 11*s* do not correctly rotate during rotation detection.

In other words, if the erroneous determination is obtained, auxiliary pulse signals are not output and the procedure proceeds to the next processing although neither the hour-and-minute motor 10*m* nor the seconds motor 10*s* correctly rotates. Hand movement is not achieved at the appropriate timing, and a time delay occurs in the time indication. Therefore, this erroneous determination should be prevented.

Figure 3:
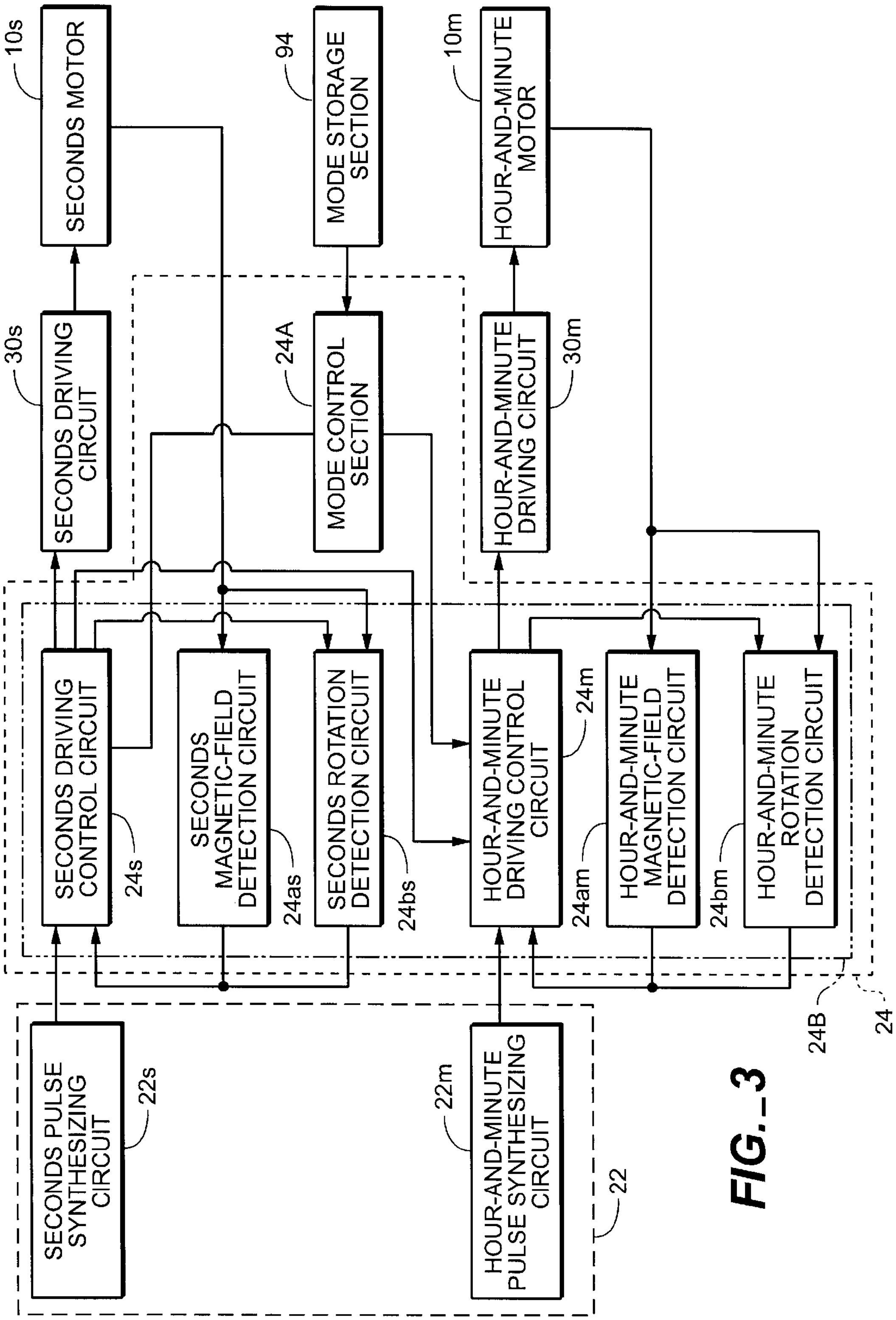
FIG. 3 is a block diagram showing the control function of a seconds motor and an hour-and-minute motor according to the embodiment.

By referring to FIG. 3, a detailed structure of a control system for controlling the driving of the hour-and-minute motor 10*m* and the seconds motor 10*s* by the use of the magnetic-field detection and the rotation detection performed in the driving control circuit 24 will be described next.

The pulse synthesizing circuit 22 includes a seconds pulse synthesizing circuit 22*s* for generating a reference pulse and synthesized pulse signals and for sending these signals to a seconds driving control circuit 24*s*, described later, and an hour-and-minute pulse synthesizing circuit 22*m* for generating a reference pulse and synthesized pulse signals and for sending these signals to an hour-and-minute driving control circuit 24*m*, described later.

The driving control circuit 24 is generally provided with the mode control section 24A for achieving mode control according to the storage state of the mode storage section 94, and an output-timing control section 24B for controlling the output timing of the driving pulses.

The output-timing control section 24B includes the seconds driving control circuit 24*s*, a seconds magnetic-field detection circuit 24*as*, a seconds rotation detection circuit 24*bs*, the hour-and-minute driving control circuit 24*m*, an hour-and-minute magnetic-field detection circuit 24*am*, and an hour-and-minute rotation detection circuit 24*bm*.

The seconds magnetic-field detection circuit 24*as* detects a magnetic field which affects rotation detection around the seconds motor 10*s* according to whether a voltage induced across the driving coil 11*s* by electromagnetic induction caused by an external magnetic field exists, and outputs a detected signal to the seconds driving control circuit 24*s*.

The seconds rotation detection circuit 24*bs* detects the level of a voltage induced across the driving coil 11*s* of the seconds motor 10*s* after the seconds driving circuit 30*s* outputs a driving pulse signal for rotating the seconds motor 10*s*, and outputs a detection signal corresponding to whether rotation has been detected to the seconds driving control circuit 24*s*.

The seconds driving control circuit 24*s* generates a driving pulse signal from various pulse signals output from the seconds pulse synthesizing circuit 22*s*, according to the signals detected by the seconds magnetic-field detection circuit 24*as* and the seconds rotation detection circuit 24*bs*, outputs it to the seconds driving circuit 30*s*, and also outputs a control signal to the hour-and-minute driving control circuit 24*m*.

The hour-and-minute magnetic-field detection circuit 24*am* detects a magnetic field around the hour-and-minute motor 10*m* and outputs a detected signal to the hour-and-minute driving control circuit 24*m*.

The hour-and-minute rotation detection circuit 24*bm* detects the level of a voltage induced across the driving coil 11*m* of the hour-and-minute motor 10*m* after the hour-and-minute driving circuit 30*m* outputs a driving pulse signal for rotating the hour-and-minute motor 10*m*, and outputs a detection signal corresponding to whether rotation has been detected to the hour-and-minute driving control circuit 24*m*.

The hour-and-minute driving control circuit 24*m* generates a driving pulse signal from various pulse signals output from the hour-and-minute pulse synthesizing circuit 22*m*, according to the signals detected by the hour-and-minute magnetic-field detection circuit 24*am* and the hour-and-minute rotation detection circuit 24*bm* and the control signal sent from the seconds driving control circuit 24*s*, and outputs it to the hour-and-minute driving circuit 30*m*.

Basic operations of the magnetic-field detection circuits and the rotation detection circuits will be described below by referring to FIG. 4 and FIG. 5. In this case, since the seconds magnetic-field detection circuit 24*as* has the same structure as the hour-and-minute magnetic-field detection circuit 24*am*, and the seconds rotation detection circuit 24*bs* has the same structure as the hour-and-minute rotation detection circuit 24*bm*, only the seconds magnetic-field detection circuit 24*as* and the seconds rotation detection circuit 24*bs* will be described.

Figure 4:
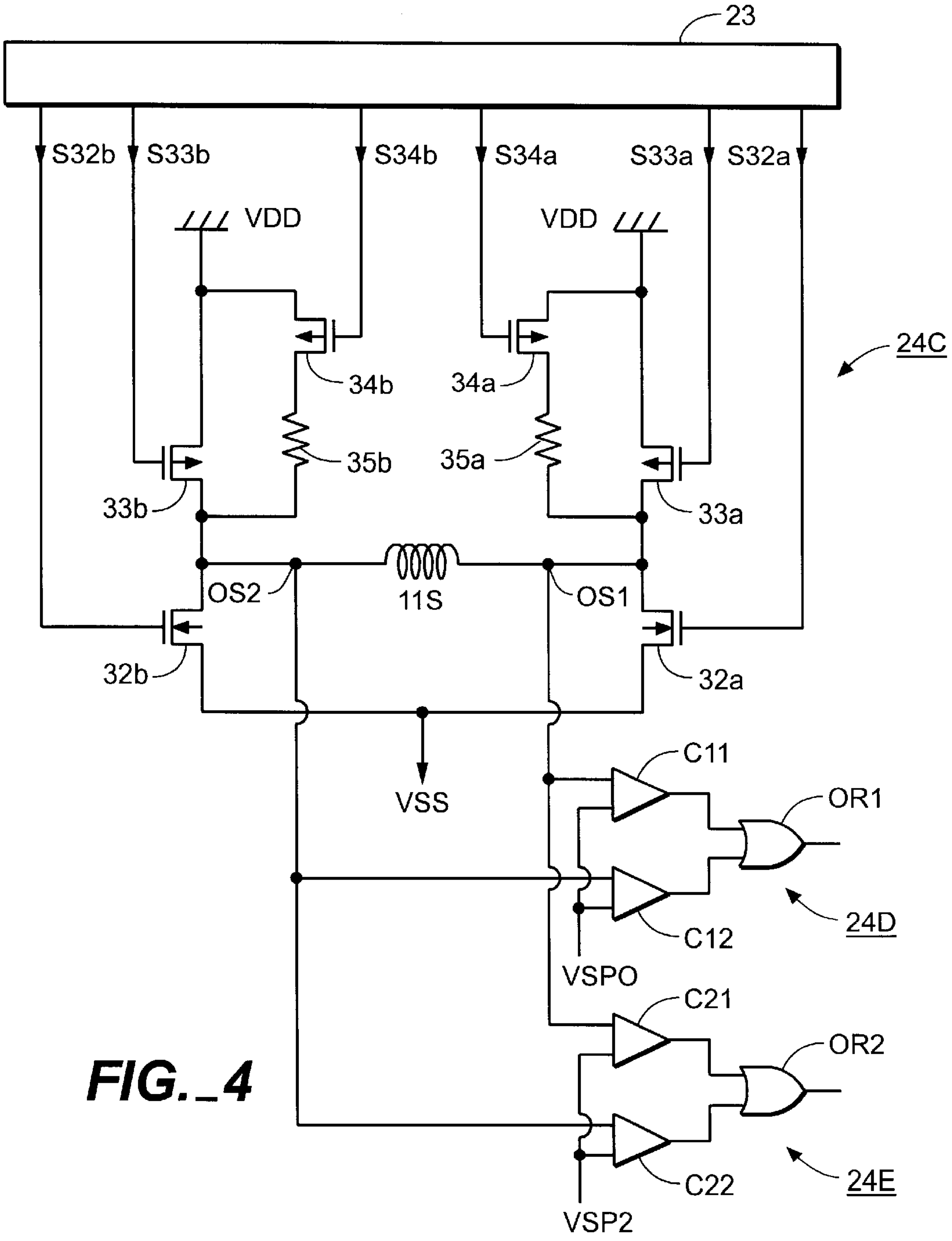
FIG. 4 is a structural descriptive view of a magnetic-field detection circuit and a rotation detection circuit.
Figure 5:
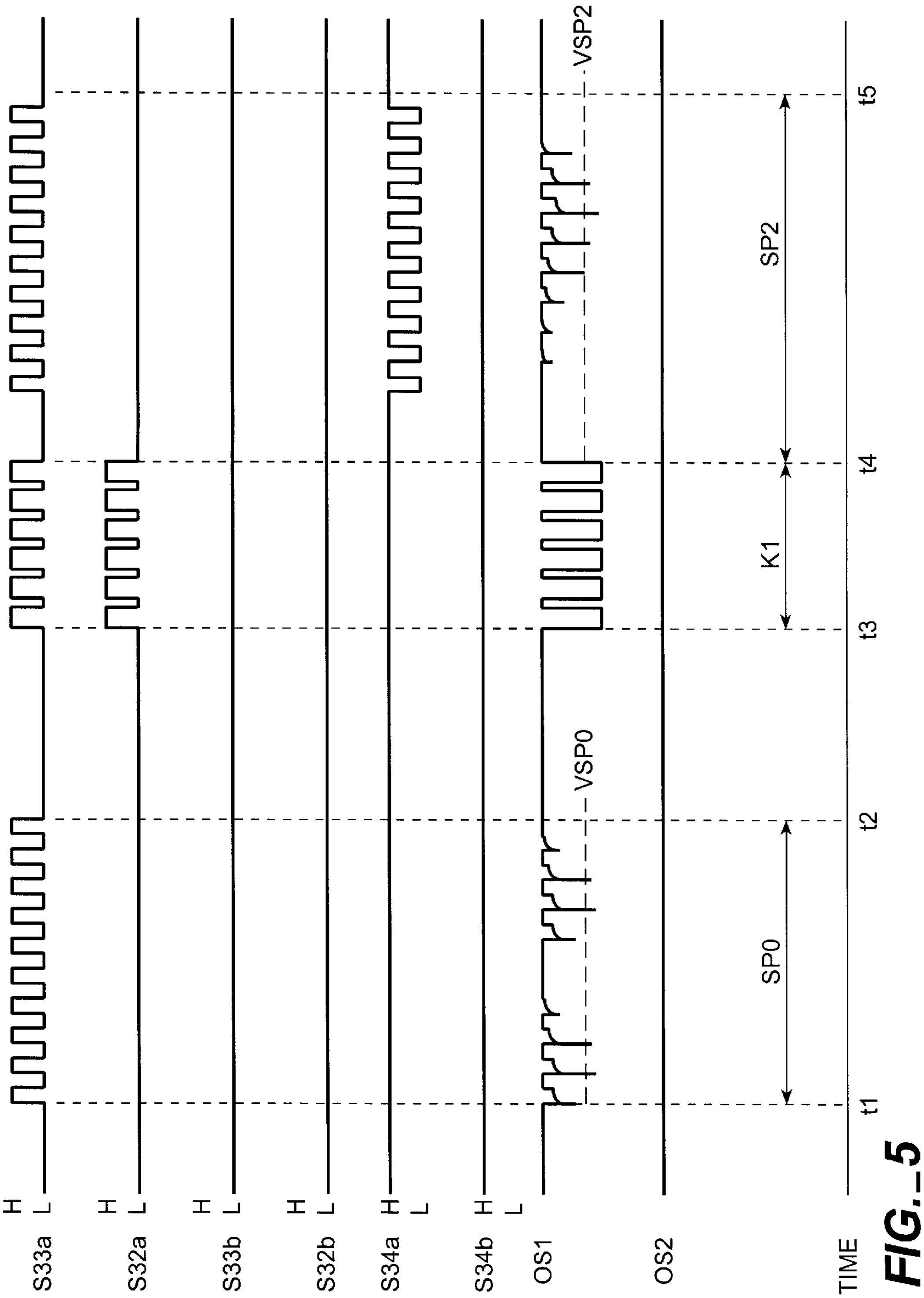
FIG. 5 is an operation timing chart of the magnetic-field detection circuit and the rotation detection circuit.

As shown in FIG. 4, the seconds magnetic-field detection circuit 24*as* and the seconds rotation detection circuit 24*bs* share a fundamental portion. Actually, the seconds magnetic-field detection circuit 24*as* is formed of a shared circuit 24C and a seconds-magnetic-field-detection characteristic circuit 24D, and the seconds rotation detection circuit 24*bs* is formed of the shared circuit 24C and a seconds-rotation-detection characteristic circuit 24E.

The shared circuit 24C also serves as a part of a motor driving section, and includes an N-channel MOS transistor 32*a* of which the drain terminal is connected to one terminal OS1 of the motor driving coil 11S, the source terminal is connected to the lower-potential power supply Vss, and the gate terminal receives a control signal S32*a* from a control circuit 23; a P-channel MOS transistor 33*a* of which the source terminal is connected to the higher-potential power supply Vdd, the drain terminal is connected to the terminal OS1, and the gate terminal receives a control signal S33*a* from the control circuit 23; a P-channel MOS transistor 34*a* of which the source terminal is connected to the higher-potential power supply Vdd, and the gate terminal receives a control signal S34*a* from the control circuit 23; an N-channel MOS transistor 32*b* of which the drain terminal is connected to the other terminal OS2 of the motor driving coil 11S, the source terminal is connected to the lower-potential power supply Vss, and the gate terminal receives a control signal S32*b* from the control circuit 23; a P-channel MOS transistor 33*b* of which the source terminal is connected to the higher-potential power supply Vdd, the drain terminal is connected to the terminal OS2, and the gate terminal receives a control signal S33*b* from the control circuit 23; and a P-channel MOS transistor 34*b* of which the source terminal is connected to the higher-potential power supply Vdd, and the gate terminal receives a control signal S34*b* from the control circuit 23.

The seconds-magnetic-field-detection characteristic circuit 24D detects a magnetic field according to the voltage levels at the terminal OS1 and the terminal OS2, and is formed of a first magnetic-field detection comparator C11 of which one input terminal is connected to the terminal OS1 and the other input terminal receives a reference voltage VSPO, a seconds magnetic-field detection comparator C12 of which one input terminal is connected to the terminal OS2 and the other input terminal receives the reference voltage VSPO, and a first OR circuit OR1 which calculates the logical sum of the output signals of the first magnetic-field detection comparator and the seconds magnetic-field detection comparator, and outputs it as a magnetic-field detection signal.

The seconds-rotation-detection characteristic circuit 24E detects rotation according to the voltage levels at the terminal OS1 and the terminal OS2, and is formed of a detection resistor 35*a* of which one end is connected to the drain terminal of the P-channel MOS transistor 34*a* and the other end is connected to the terminal OS1 of the motor driving coil 11S, a detection resistor 35*b* of which one end is connected to the drain terminal of the P-channel MOS transistor 34*b* and the other end is connected to the terminal OS2 of the motor driving coil 11S, a first rotation detection comparator C21 of which one input terminal is connected to the terminal OSI and the other input terminal receives a reference voltage VSP2, a seconds rotation detection comparator C22 of which one input terminal is connected to the terminal OS2 and the other input terminal receives the reference voltage VSP2, and a second OR circuit OR2 which calculates the logical sum of the output signals of the first rotation detection comparator C21 and the seconds rotation detection comparator C22, and outputs it as a rotation detection signal.

The operations will be described next by referring to an operation timing chart in FIG. 5. The following description applies to a case in which a motor pulse is output to the terminal OS1.

It is assumed that, in an initial state, the control signals S33*a*, S32*a*, S33*b*, and S32*b* are at an "L" level, and the control signals S34*a* and S34*b* are at an "H" level. As a result, the N-channel MOS transistor 32*a* is off, the P-channel MOS transistor 33*a* is on, the P-channel MOS transistor 34*a* is off, the N-channel MOS transistor 32*b* is off, the P-channel MOS transistor 33*b* is on, and the P-channel MOS transistor 34*b* is off.

During the period from time t1 to time t2, a magnetic field which affects rotation detection is detected around the seconds motor according to whether a voltage induced across the driving coil 11S due to electromagnetic induction caused by an external magnetic field exists.

More specifically, the signal level of the control signal S33*a* is switched at a predetermined interval to turn on and off the P-channel MOS transistor 33*a* at the predetermined interval. The terminal OS1 of the driving coil 11S, which is connected to VDD at both ends, is alternately connected and disconnected to and from the higher-potential power supply Vdd to chopper-amplify a voltage induced at the terminal OS1.

The chopper-amplified voltage is compared with the reference voltage VSPO in the first magnetic-field detection comparator C11 for magnetic-field detection.

In other words, if a voltage is not induced across the driving coil 11S by electromagnetic induction caused by an external magnetic field, the voltage input to the first magnetic-field detection comparator does not exceed the reference voltage VSPO. In this case, it is determined that an external magnetic field which affects rotation detection does not exist.

Conversely, when a voltage is induced across the driving coil 11S by electromagnetic induction caused by an external magnetic field, the voltage input to the first magnetic-field detection comparator C11 positively exceeds the reference voltage VSP0. In this case, it is determined that an external magnetic field which affects rotation detection exists.

During the period from time t3 to time t4, the control signal S33*a* and the control signal S32*a* are turned on and off in synchronization at a predetermined interval. A driving current flows through a path of the higher-potential power supply Vdd, the P-channel MOS transistor 33*b*, the terminal OS2, the driving coil 11S, the terminal OS1, the N-channel MOS transistor 32*a*, and the lower-potential power supply Vss at the predetermined interval. Motor driving pulses K1 are applied to the terminal OS1, and the seconds motor is driven.

During the period from time t4 to time t5, it is determined according to a voltage induced by rotation whether the seconds motor has rotated by the motor driving pulses K1.

More specifically, the signal levels of the control signal S33*a* and the control signal S34*a* are switched in synchronization at a predetermined interval to turn on and off the P-channel MOS transistor 33*a* and the P-channel MOS transistor 34*a* at the predetermined interval. The terminal OS1 of the driving coil 11S, which is connected to VDD at both ends, is alternately connected and disconnected to and from the higher-potential power supply Vdd through the detection resistor 35*a* to chopper-amplify a voltage induced at the terminal OS1.

A detection current flows into the detection resistor 35*a*, and the chopper-amplified detected voltage is compared with the reference voltage VSP2 in the first rotation detection comparator C21 for rotation detection.

In other words, if a voltage is not induced across the driving coil 11S by electromagnetic induction caused by the rotation of the seconds motor, the voltage input to the first rotation detection comparator does not exceed the reference voltage VSP2. In this case, it is determined that rotation is not detected.

Conversely, when a voltage is induced across the driving coil 11S by electromagnetic induction caused by the rotation of the seconds motor, the voltage input to the first rotation detection comparator positively exceeds the reference voltage VSP2. In this case, it is determined that rotation is detected.

In the foregoing description, the motor pulses are output from the terminal OS1. When the motor pulses are output from the terminal OS2, the on/off control of the MOS transistors 32*b*, 33*b*, and 34*b* needs to be performed at the terminal OS2 side in the same way as above.

[1.2] Operation of the first embodiment

[1.2.1] Control operation for a plurality of motors

Figure 6:
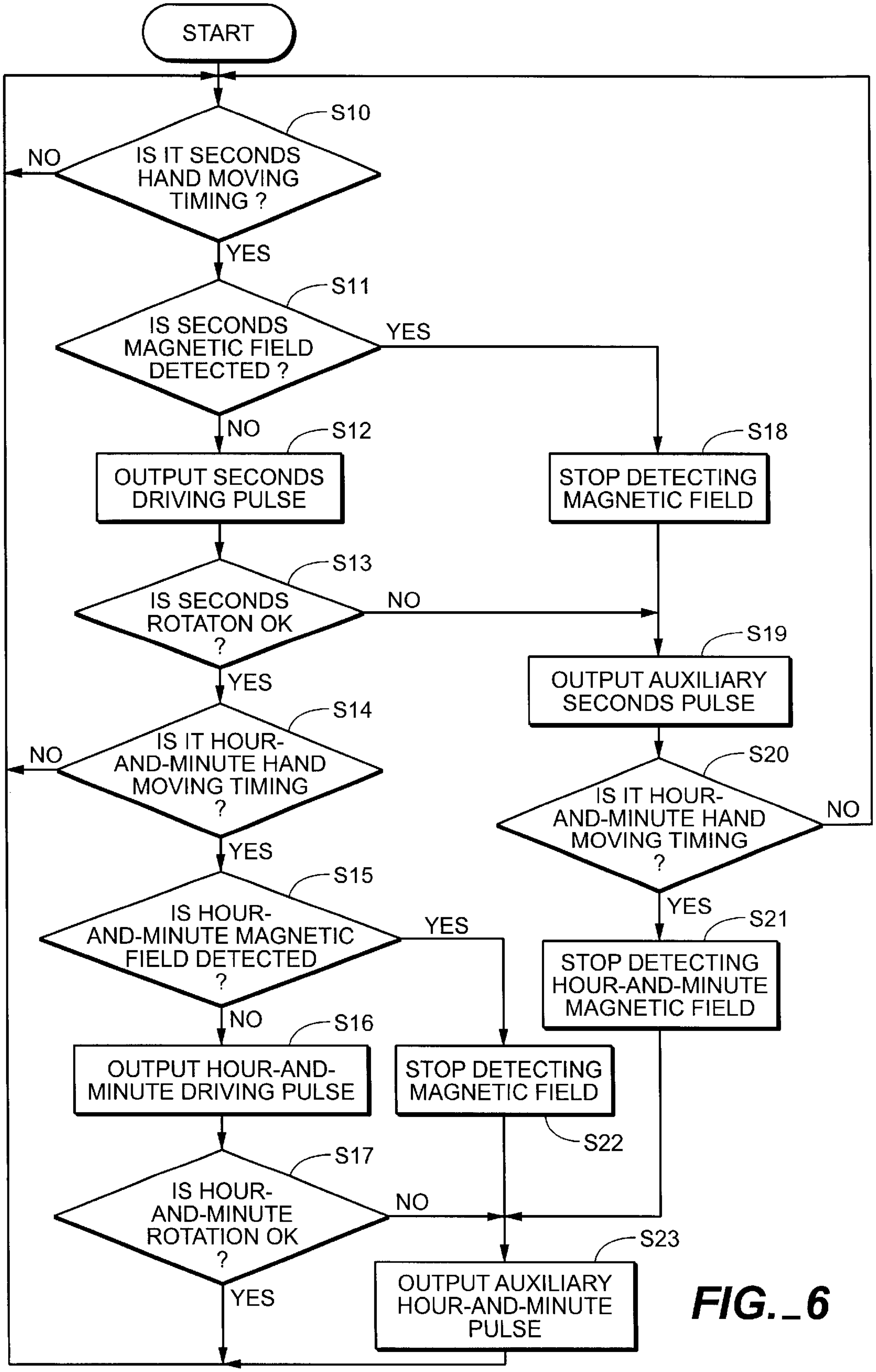
FIG. 6 is a flowchart of processing for controlling the driving of the hour-and-minute motor by the use of the magnetic-field detection and the rotation detection of the seconds motor by a driving control circuit according to the embodiment.

An example operation for controlling the driving of the hour-and-minute motor 10*m* according to the results of the magnetic-field detection and the rotation detection of the seconds motor 10*s* will be described below by referring to a flowchart shown in FIG. 6.

The output-timing control section 24B determines whether it is a hand moving timing for the seconds hand (step S10).

When it is determined in the step S10 that it is not a hand moving timing for the seconds hand (No in the step S10), the determination in the step S10 is repeated until a hand moving timing for the seconds hand occurs.

When it is determined in the step S10 that it is a hand moving timing for the seconds hand (Yes in the step S10), the seconds magnetic-field detection circuit 24*as* detects a magnetic field around the seconds motor 10*s* to determine whether an external magnetic field which affects rotation detection exists (in a step S11).

When it is determined in the step S11 that an external magnetic field which affects rotation detection is not detected (No in the step S11), the seconds driving pulse signal is output from the seconds driving control circuit 24*s* to the seconds motor 10*s* through the seconds driving circuit 30*s* (in a step S12).

Next, it is determined whether the seconds motor 10*s* normally rotates by the seconds driving pulse signal (in a step S13).

When it is determined in the step S13 that the seconds motor 10*s* does not normally rotate (No in the step S13), the procedure proceeds to a step S19.

When it is determined in the step S13 that the seconds motor 10*s* normally rotates (Yes in the step S13), it is determined whether it is a hand moving timing for the hour and minute hands in the driving control circuit 24 (in a step S14).

When it is determined in the step S14 that it is not a hand moving timing for the hour and minute hands (No in the step S14), the procedure returns to the step 10 and the subsequent processing is repeated.

When it is determined in the step S14 that it is a hand moving timing for the hour and minute hands (Yes in the step S14), the hour-and-minute magnetic-field detection circuit 24*am* detects a magnetic field around the hour-and-minute motor 10*m* to determine whether an external magnetic field which affects rotation detection exists (in a step S15).

When it is determined in the step S15 that an external magnetic field which affects rotation detection is not detected (No in the step S15), the hour-and-minute driving control circuit 24*m* outputs the hour-and-minute driving pulse signal to the hour-and-minute motor 10*m* through the hour-and-minute driving circuit 30*m* (in a step S16).

Next, it is determined whether the hour-and-minute motor normally rotates by the hour-and-minute driving pulse signal (in a step S17).

When it is determined in the step S17 that the hour-and-minute motor 10*m* does not normally rotate (No in the step S17), the procedure proceeds to a step S23.

When it is determined in the step S17 that the hour-and-minute motor 19*m* normally rotates (Yes in the step S17), the procedure returns to the step S10 and the subsequent processing is repeated.

When it is determined in the step S11 that an external magnetic field which affects rotation detection is detected around the seconds motor lOs (Yes in the step S11), the seconds driving control circuit 24*s* stops outputting a signal used for detecting the magnetic field of the seconds motor 10*s* (in a step S18).

Then, the seconds driving control circuit 24*s* controls the seconds driving circuit 30*s* to output the auxiliary seconds pulse signal to the seconds motor 10*s* (in a step S19).

Next, the output-timing control section 24B determines whether it is a hand moving timing for the hour and minute hands (in a step S20).

When it is determined in the step S20 that it is not a hand moving timing for the hour and minute hands (No in the step S20), the procedure returns to the step S10 and the subsequent processing is repeated.

When it is determined in the step S20 that it is a hand moving timing for the hour and minute hands (Yes in the step S20), the hour-and-minute driving control circuit 24*m* stops outputting the signal used for detecting an external magnetic field around the hour-and-minute motor 10*m* and the signal used for detecting the rotation of the hour-and-minute motor 10*m* (in a step S21). In this case, the hour-and-minute driving control circuit 24*m* stops an operation in which the detection signal has been output to some extent, or the hour-and-minute driving control circuit 24*m* stops outputting the detection signal before it actually outputs the detection signal. Then, the hour-and-minute driving control circuit 24*m* outputs the auxiliary our-and-minute pulse signal to the hour-and-minute motor 10*m* through the hour-and-minute driving circuit 30*m* (in a step S23), the procedure returns to the step S10, and the subsequent processing is repeated.

In this way, when the auxiliary pulse signal for driving the seconds motor 10*s* is output in the step S19, since the magnetic-field detection and the rotation detection of the hour-and-minute motor 10*m* are stopped in the step S21, the hour-and-minute driving control circuit 24*m* does not output the driving pulse signal which is usually output first for driving the hour and minute hands. Therefore, the period of time between the hand moving timing for the seconds hand and that for the hour and minute hands can be shortened, both timings are set such that a current load due to the driving of the seconds motor 10*s*, which drives the seconds hand, and that due to the hour-and-minute motor 10*m*, which drives the hour and minute hand, do not overlap.

When it is determined in the step S15 that an external magnetic field which affects rotation detection is detected around the hour-and-minute motor 10*m* (Yes in the step S15), the hour-and-minute driving control circuit 24*m* stops outputting the signal used for detecting the rotation of the hour-and-minute motor 10*m* (in a step S22).

Then, the hour-and-minute driving control circuit 24*m* outputs the auxiliary hour-and-minute pulse signal to the hour-and-minute motor 10*m* through the hour-and-minute driving circuit 30*m* (in the step S23), the procedure returns to the step S10, and the subsequent processing is repeated.

[1.2.2] Specific examples of motor pulse timing for the plurality of motors

Figure 7:
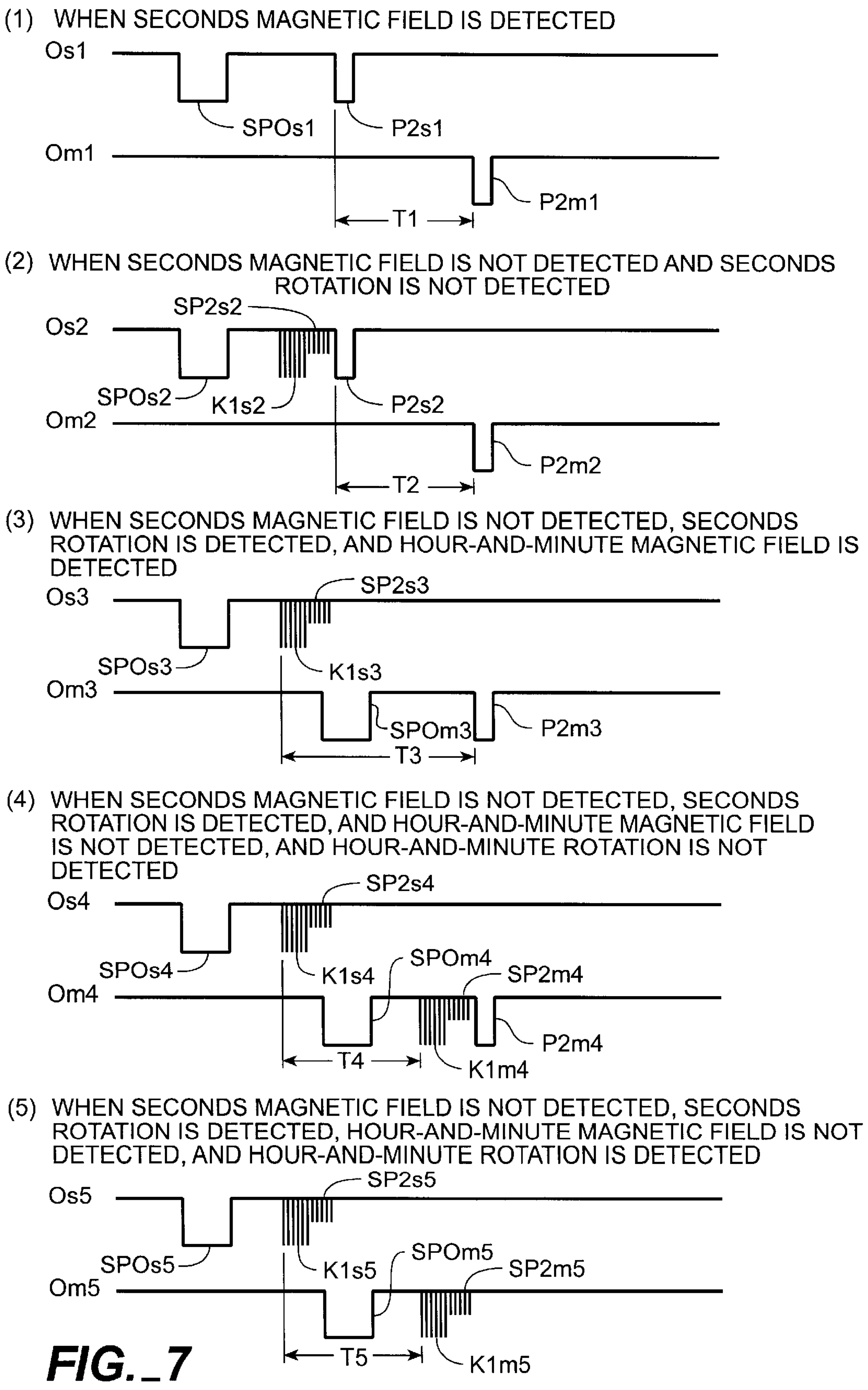
FIG. 7 is a view showing motor-pulse timing for the seconds motor and the hour-and-minute motor according to the embodiment.

FIG. 7 shows specific examples of motor pulse timing specified such that a current load for driving the hour-and-minute motor 10*m* and that for driving the seconds motor 10*s* do not overlap in a case in which hand moving timing is set within a range in which a difference in hand moving timing between the seconds hand and the hour and minute hands is inconspicuous to the user. The specific examples will be described below according to the flowchart shown in FIG. 6.

[1.2.2.1] Motor pulse timing in a first specific example

A case in which an external magnetic field which affects rotation detection is detected around the seconds motor 10*s* will be described first by referring to FIG. 7(1).

At the hand moving timing of the seconds hand (in the step S10), the seconds driving control circuit 24*s* outputs a pulse signal SP0*s*1 used for detecting a magnetic field around the seconds motor 10*s* (in the step S11), as indicated by seconds-motor pulse timing 0*s*1.

When the seconds magnetic-field detection circuit 24*as* detects an external magnetic field which affects rotation detection around the seconds motor 10*s* (Yes in the step S11), the seconds driving control circuit 24*s* stops outputting the pulse signal used for detecting the magnetic field of the seconds motor 10*s* (in the step S18).

Then, the seconds driving control circuit 24*s* outputs an auxiliary pulse signal P2*s*1 for driving the seconds motor 10*s* (in the step S19) to drive the seconds motor 10*s*.

At the hand moving timing of the hour and minute hands (in the step S20), as indicated by hour-and-minute pulse timing 0*m*1, the hour-and-minute driving control circuit 24*m* stops outputting a pulse signal used for detecting the magnetic field of the hour-and-minute motor 10*m* in order to prevent a voltage reduction caused by the outputting of the driving pulse signal for driving the hour-and-minute motor. It also stops outputting the pulse signal for rotation detection because rotation detection is not required when the outputting of the driving pulse signal is stopped (in the step S21).

The hour-and-minute driving control circuit 24*m* outputs an auxiliary pulse signal P2*m*1 for driving the hour-and-minute motor 10*m* (in the step S23) to drive the hour-and-minute motor 10*m*.

In other words, when the auxiliary pulse signal P2*s*1 for driving the seconds motor 10*s* is output in the step S19, since the detection of the magnetic field and the rotation of the hour-and-minute motor 10*m* is stopped in the step S21, the hour-and-minute driving control circuit 24*m* does not output a driving pulse which is usually output first for driving the hour and minute hands. As a result, the time T1 is obtained in which the current load due to the driving of the seconds motor 10*s*, which drives the seconds hand, and that due to the driving of the hour-and-minute motor 10*m*, which drives the hour and minute hands, do not overlap.

[1.2.2.2] Motor pulse timing in a second specific example

A case in which an external magnetic field which affects rotation detection is not detected around the seconds motor 10*s* and a normal rotation of the seconds motor 10*s* is not detected will be described below by referring to FIG. 7(2).

At the hand moving timing of the seconds hand (in the step S10), the seconds driving control circuit 24*s* outputs a pulse signal SP0*s*2 used for detecting a magnetic field around the seconds motor 10*s* (in the step S11), as indicated by seconds pulse timing O*s*2.

When the seconds magnetic-field detection circuit 24*as* does not detect an external magnetic field which affects rotation detection around the seconds motor 10*s* (No in the step S11), the seconds driving control circuit 24*s* outputs a driving pulse signal K1*s*2 used for driving the seconds motor 10*s* (in the step S12) to drive the seconds motor 10*s*.

Then, as indicated by seconds pulse timing Os2, the seconds driving control circuit 24*s* outputs a pulse signal SP2*s*2 used for the rotation detection of the seconds motor 10*s* (in the step S13).

When the seconds rotation detection circuit 24*bs* does not detect the rotation of the seconds motor 10*s* (No in the step S13), the seconds driving control circuit 24*s*outputs an auxiliary pulse signal P2*s*2 for driving the seconds motor 10*s* (in the step S19) to drive the seconds motor 10*s*.

At the hand moving timing of the hour and minute hands (in the step S20), as indicated by hour-and-minute pulse timing 0*m*2, the hour-and-minute driving control circuit 24*m* stops outputting a pulse signal used for detecting the magnetic field of the hour-and-minute motor 10*m* in order to prevent a voltage reduction caused by the outputting of the driving pulse signal for driving the hour-and-minute motor. It also stops outputting the pulse signal for rotation detection because rotation detection is not required when the outputting of the driving pulse signal is stopped (in the step S21).

The hour-and-minute driving control circuit 24*m* outputs an auxiliary pulse signal P2*m*2 for driving the hour-and-minute motor 10*m* (in the step S23) to drive the hour-and-minute motor 10*m*.

In other words, when the auxiliary pulse signal P2*s*2 for driving the seconds motor 10*s* is output in the step S19, since the detection of the magnetic field and the rotation of the hour-and-minute motor 10*m* is stopped in the step S21, the hour-and-minute driving control circuit 24*m* does not output a driving pulse which is usually output first for driving the hour and minute hands. As a result, the time T2 is obtained in which the current load due to the driving of the seconds motor 10*s*, which drives the seconds hand, and that due to the driving of the hour-and-minute motor 10*m*, which drives the hour and minute hands, do not overlap.

[1.2.2.3] Motor pulse timing in a third specific example

A case in which an external magnetic field which affects rotation detection is not detected around the seconds motor 10*s*, a normal rotation of the seconds motor 10*s* is detected, and an external magnetic field which affects rotation detection is detected around the hour-and-minute motor 10*m* will be described below by referring to FIG. 7(3).

At the hand moving timing of the seconds hand (in the step S10), the seconds driving control circuit 24*s* outputs a pulse signal SP0*s*3 used for detecting a magnetic field around the seconds motor 10*s* (in the step S11), as indicated by seconds pulse timing 0*s*3.

When the seconds magnetic-field detection circuit 24*as* does not detect an external magnetic field which affects rotation detection around the seconds motor 10*s* (No in the step S11), the seconds driving control circuit 24*s* outputs a driving pulse signal K1*s*3 used for driving the seconds motor 10*s* (in the step S12) to drive the seconds motor 10*s*.

Then, as indicated by seconds pulse timing 0*s*3, the seconds driving control circuit 24*s* outputs a pulse signal SP2*s*3 used for the rotation detection of the seconds motor 10*s* (in the step S13).

When the seconds rotation detection circuit 24*bs* detects the normal rotation of the seconds motor 10*s* (Yes in the step S13), it is determined that the seconds motor 10*s* is normally driven.

At the hand moving timing of the hour and minute hands (in the step S20), as indicated by hour-and-minute pulse timing 0*m*3, the hour-and-minute driving control circuit 24*m* outputs a pulse signal SP0*m*3 for detecting a magnetic field around the hour-and-minute motor 10*m* (in the step S15). When an external magnetic field which affects rotation detection is detected around the hour-and-minute motor 10*m* (Yes in the step S15), the hour-and-minute driving control circuit 24*m* stops outputting a pulse signal used for detecting the magnetic field of the hour-and-minute motor 10*m* (in the step S22).

The hour-and-minute driving control circuit 24*m* outputs an auxiliary pulse signal P2*m*3 for driving the hour-and-minute motor 10*m* (in the step S23) to drive the hour-and-minute motor 10*m*.

In this case, the time T3 equals the maximum time difference between the hand moving timing of the seconds hand and that of the hour and minute hands. In this example, the maximum time difference is set in a range in which a difference between the hand moving timing of the seconds hand and that of the hour and minute hands is inconspicuous to the user.

[1.2.2.4] Motor pulse timing in a fourth specific example

A case in which an external magnetic field which affects rotation detection is not detected around the seconds motor 10*s*, a normal rotation of the seconds motor 10*s* is detected, an external magnetic field which affects rotation detection is not detected around the hour-and-minute motor 10*m*, and a normal rotation of the hour-and-minute motor 10*m* is not detected will be described below by referring to FIG. 7(4).

At the hand moving timing of the seconds hand (in the step S10), the seconds driving control circuit 24*s* outputs a pulse signal SP0*s*4 used for detecting a magnetic field around the seconds motor 10*s* (in the step S11), as indicated by seconds pulse timing 0*s*4.

When the seconds magnetic-field detection circuit 24*as* does not detect an external magnetic field which affects rotation detection around the seconds motor 10*s* (No in the step S11), the seconds driving control circuit 24*s* outputs a driving pulse signal K1*s*4 used for driving the seconds motor 10*s* (in the step S12) to drive the seconds motor 10*s*.

Then, as indicated by seconds pulse timing 0*s*4, the seconds driving control circuit 24*s* outputs a pulse signal SP2*s*4 used for the rotation detection of the seconds motor 10*s* (in the step S13). When the seconds rotation detection circuit 24*bs* detects the normal rotation of the seconds motor 10*s* (Yes in the step S13), it is determined that the seconds motor 10*s* is normally driven.

At the hand moving timing of the hour and minute hands (in the step S20), as indicated by hour-and-minute pulse timing 0*m*4, the hour-and-minute driving control circuit 24*m* outputs a pulse signal SP0*m*4 for detecting a magnetic field around the hour-and-minute motor 10*m* (in the step S15).

When the hour-and-minute magnetic-field detection circuit 24*am* does not detect an external magnetic field which affects rotation detection around the hour-and-minute motor 10*m* (No in the step S15), the hour-and-minute driving control circuit 24*m* outputs a driving pulse signal K1*m*4 for driving the hour-and-minute motor 10*m* (in the step S16) to drive the hour-and-minute motor 10*m*.

Then, as indicated by the hour-and-minute pulse timing 0*m*4, the hour-and-minute driving control circuit 24*m* outputs a pulse signal SP2*m*4 used for the rotation detection of the hour-and-minute motor 10*m* (in the step S17).

When the hour-and-minute detection circuit 24*bm* does not detect the normal rotation of the hour-and-minute motor 10*m* (No in the step S17), the hour-and-minute driving control circuit 24*m* outputs an auxiliary pulse signal P2*m*4 for driving the hour-and-minute motor 10*m* (in the step S23) to drive the hour-and-minute motor 10*m*.

In other words, since the driving pulse signal K1*s*4 for driving the seconds motor 10*s* is output in the step S12, the seconds motor 10*s* is normally driven. Therefore, the output of an auxiliary pulse signal which is to be scheduled thereafter is omitted. Consequently, the time T4 is obtained in which the current load caused by the driving of the seconds motor 10*s* and that caused by the driving of the hour-and-minute motor 10*m* do not overlap.

[1.2.2.5] Motor pulse timing in a fifth specific example

A case in which an external magnetic field which affects rotation detection is not detected around the seconds motor 10*s*, a normal rotation of the seconds motor 10*s* is detected, an external magnetic field which affects rotation detection is not detected around the hour-and-minute motor 10*m*, and the normal rotation of the hour-and-minute motor 10*m* is detected will be described below by referring to FIG. 7(5).

At the hand moving timing of the seconds hand (in the step S10), the seconds driving control circuit 24*s* outputs a pulse signal SP0s5 used for detecting a magnetic field around the seconds motor 10s (in the step S11), as indicated by seconds pulse timing 0s5.

When the seconds magnetic-field detection circuit 24as does not detect an external magnetic field which affects rotation detection around the seconds motor 10s (No in the step S11), the seconds driving control circuit 24s outputs a driving pulse signal K1s5 used for driving the seconds motor 10s (in the step S12) to drive the seconds motor 10s.

Then, as indicated by the seconds pulse timing 0s5, the seconds driving control circuit 24s outputs a pulse signal SP2s5 used for the rotation detection of the seconds motor 10s (in the step S13). When the seconds rotation detection circuit 24bs detects the normal rotation of the seconds motor 10s (Yes in the step S13), it is determined that the seconds motor 10s is normally driven.

At the hand moving timing of the hour and minute hands (in the step S20), as indicated by hour-and-minute pulse timing 0m5, the hour-and-minute driving control circuit 24m outputs a pulse signal SP0mS for detecting a magnetic field around the hour-and-minute motor 10m (in the step S15).

When the hour-and-minute magnetic-field detection circuit 24am does not detect an external magnetic field which affects rotation detection around the hour-and-minute motor 10m (No in the step S15), the hour-and-minute driving control circuit 24m outputs a driving pulse signal K1m5 for driving the hour-and-minute motor 10m (in the step S16) to drive the hour-and-minute motor 10m.

Then, as indicated by the hour-and-minute pulse timing 0m5, the hour-and-minute driving control circuit 24m outputs a pulse signal SP2m5 used for the rotation detection of the hour-and-minute motor 10m (in the step S17).

When the hour-and-minute detection circuit 24bm detects the normal rotation of the hour-and-minute motor 10m (Yes in the step S17), it is determined that the hour-and-minute motor 10m is normally driven.

In this case, since the driving pulse signal K1s5 for driving the seconds motor 10s is output in the step S12, the seconds motor 10s is normally driven. Therefore, the output of an auxiliary pulse signal which is to be scheduled thereafter is omitted. Consequently, the time T5 is obtained in which the current load caused by the driving of the seconds motor 10s and that caused by the driving of the hour-and-minute motor 10m do not overlap.

[2] Second Embodiment

[2.1] Structure of second embodiment

The structure of a second embodiment will be described next.

The second embodiment differs from the first embodiment in that the hour-and-minute magnetic-field detection circuit 24am is omitted from the output-timing control section 24B.

Figure 9:
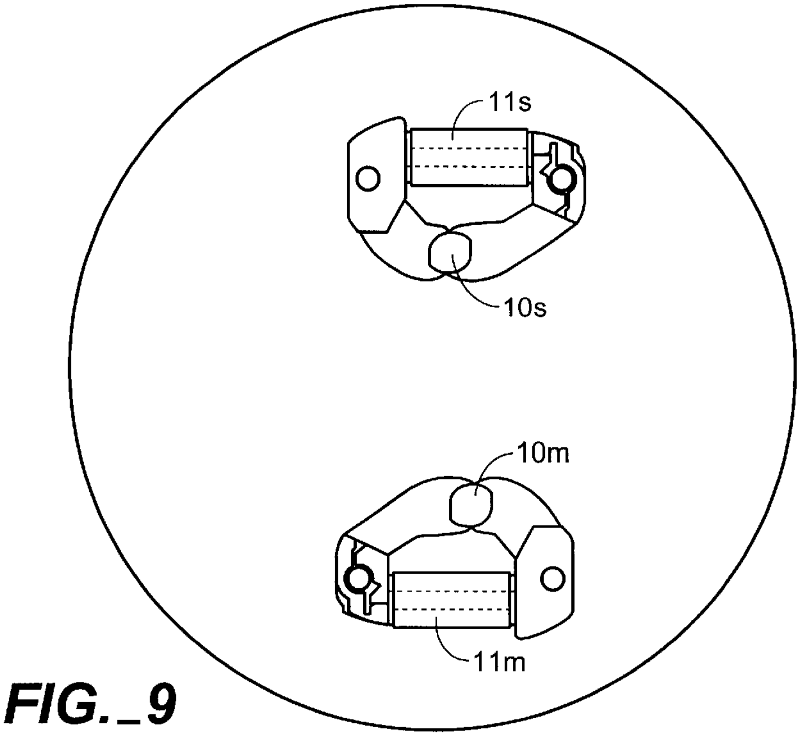
FIG. 9 is a view showing an example arrangement of coils according to the embodiment in a condition in which magnetic fields affect the coils to about the same extent.
Figure 10:
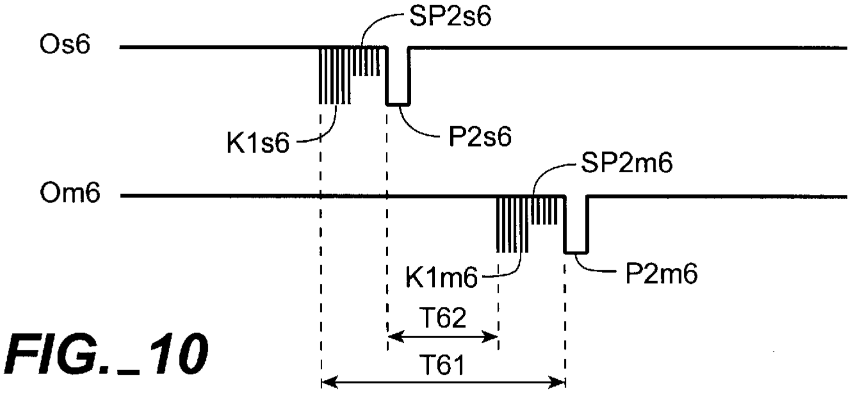
FIG. 10 is a view showing an example hand-moving timing for a plurality of motors in a conventional case.
Figure 11:
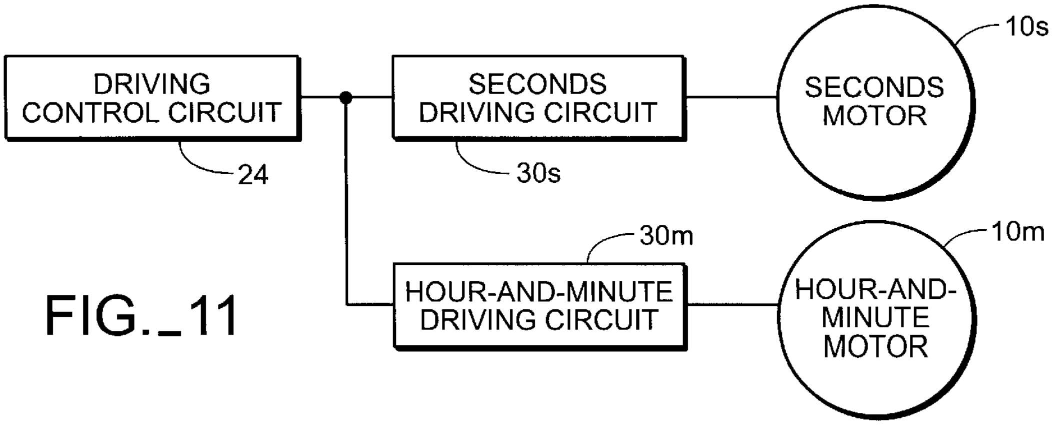
FIG. 11 is a block diagram showing the structure of general driving control of a time measuring apparatus according to the conventional case.

This is because, as shown in FIG. 9, when the seconds motor 10s and the hour-and-minute motor 10m are disposed in a positional relationship (in parallel, for example) in which it is considered that an external magnetic field has the same effect on the driving coil 11s of the seconds motor 10s and on the driving coil 11m of the hour-and-minute motor 10m, if the magnetic-field detection of the seconds motor 10s is performed, the magnetic-field detection result of the seconds motor 10s can be regarded as the magnetic-field detection result of the hour-and-minute motor 10m.

It is most preferred that the plurality of motors be disposed in parallel in terms of the equivalent effect applied by an external magnetic field. The plurality of motors can be shifted from the parallel positions unless they are disposed perpendicularly to each other, depending on the different detected levels of voltages generated by the effects of an external magnetic field in the coils of the plurality of motors. In this case, it is preferred that they be disposed within ±60 degrees (the output voltage level becomes half at 60 degrees since cos 60°=0.5).

From the above, the circuits are made efficient and control is simplified.

[2.2] Operation of the second embodiment

The operation of the second embodiment will be described next.

Figure 8:
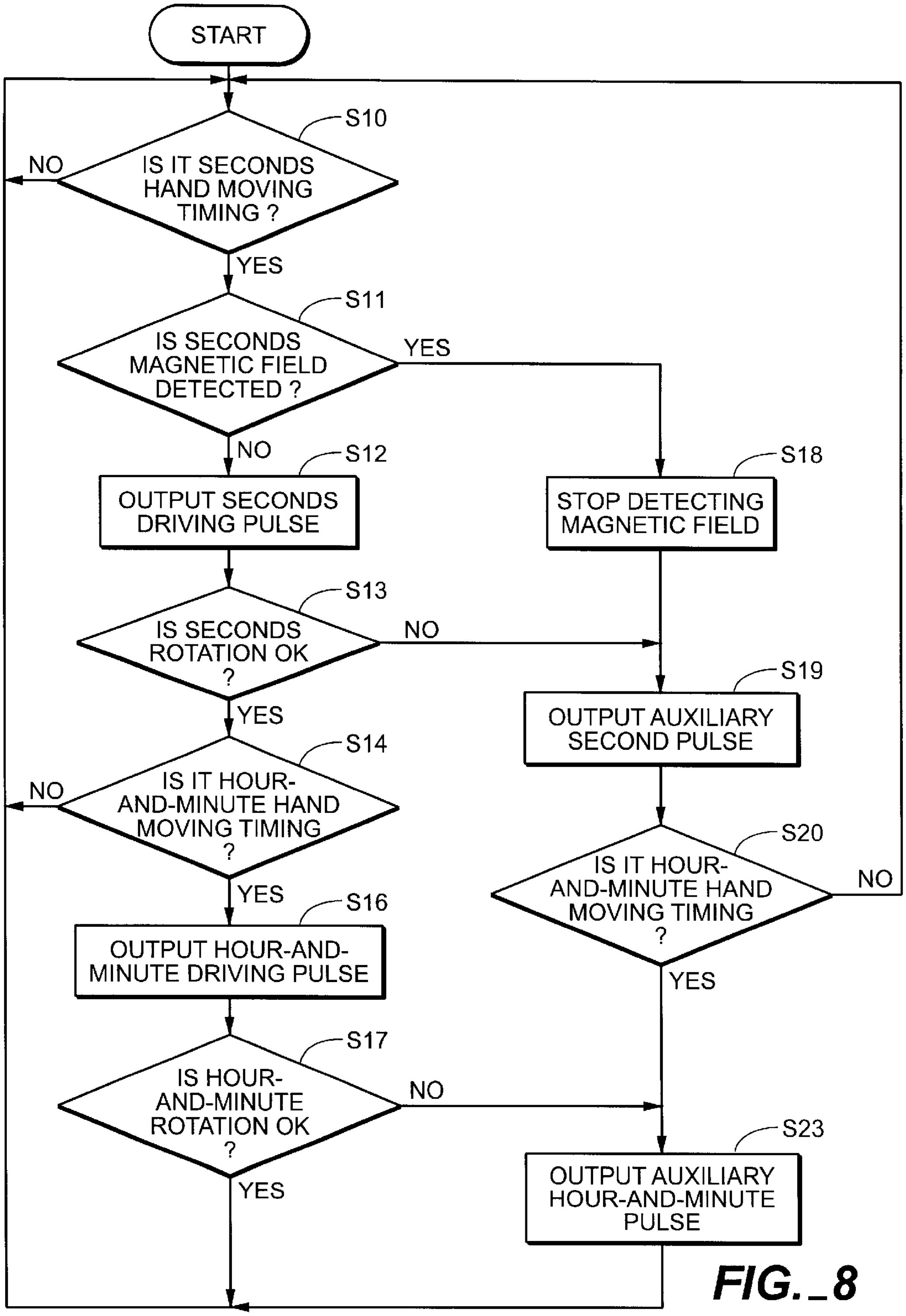
FIG. 8 is a flowchart of processing for controlling the driving of the hour-and-minute motor by the use of the magnetic-field detection and the rotation detection of the seconds motor by the driving control circuit according to the embodiment when the magnetic-field detection of the hour-and-minute motor is omitted.

The differences from the first embodiment (the flowchart shown in FIG. 6) will be described in an operational example in which the magnetic-field detection of the hour-and-minute motor 10m is omitted, by referring to a flowchart shown in FIG. 8.

In the second embodiment, when it is determined in the step S14 that it is the hand moving timing of the hour and minute hands (Yes in the step S14), the hour-and-minute driving control circuit 24m outputs the hour-and-minute driving pulse signal to the hour-and-minute motor 10m through the hour-and-minute driving circuit 30m (in the step S16).

The step S15 performed in the first embodiment, where it is determined from rotation detection by the hour-and-minute detection circuit 24am around the hour-and-minute motor 10m whether an external magnetic field which affects rotation detection exists, is omitted.

This is because, as described above, since the seconds motor 10s and the hour-and-minute motor 10m are disposed in a positional relationship (in parallel, for example) in which it is considered that an external magnetic field has the same effect on the driving coil 11s of the seconds motor 10s and on the driving coil 11m of the hour-and-minute motor 10m, if the magnetic-field detection of the seconds motor 10s is performed, the magnetic-field detection result of the seconds motor 10s can be regarded as the magnetic-field detection result of the hour-and-minute motor 10m.

Since the determination in the step S15 performed in the first embodiment is omitted in the second embodiment, the step S22 is also omitted, which is performed when an external magnetic field which affects rotation detection is detected around the hour-and-minute motor 10m.

This is because, when it is determined in the step S11 in the second embodiment that an external magnetic field which affects the rotation detection of the seconds motor 10s is detected around the seconds motor 10s (Yes in the step S11), it is considered that an external magnetic field which affects the rotation detection of the hour-and-minute motor 10m is detected around the hour-and-minute motor 10m. Therefore, in addition to the processing for stopping outputting of a signal for detecting the magnetic field of the seconds motor 10s in the seconds driving control circuit 24s, which is performed in the step S18 in the first embodiment, the outputting of the signal for detecting the magnetic field of the hour-and-minute motor 10m in the hour-and-minute driving control circuit 24m is also stopped in the second embodiment.

In the first embodiment, the hour-and-minute driving control circuit 24m stops outputting a signal for detecting an external magnetic field generated around the hour-and-minute motor 10m in the step S21.

On the other hand, in the second embodiment, since the detection processing of an external magnetic field generated around the hour-and-minute motor 10m is omitted, the processing in the step S21 in the first embodiment is omitted.

[3] Modifications

[3.1] First modification

In the above embodiments, a case in which two motors, the hour-and-minute motor 10*m* and the seconds motor 10*s*, are mounted is described. The present invention can also be applied to a case in which a plurality of motors, such as an hour motor, a minute motor, a seconds motor, and a date motor, are mounted. In other words, it is required that, with the use of the magnetic-field detection result and the rotation detection result of each motor, the driving timing of another motor should not overlap and, by the use of the magnetic-field detection result of any motor, the magnetic detection of another motor be omitted.

[3.1] Second modification

[4] Advantages of the Embodiments

In the above embodiments, as an example of the power generation apparatus 20, an electromagnetic-induction-type power generator is given. A power generation apparatus having a solar battery or a thermoelectric device and a piezoelectric device, or a stray electromagnetic-wave receiving (electromagnetic-induction-type power generation using broadcasting and communication waves) may be used. In addition, a time measuring apparatus having two or more types of these power generation apparatuses may be used.

As described above, according to the above embodiments, an electronic unit and a control method for an electronic unit, which suppress a reduction in power-supply voltage even if a plurality of motors are driven and allow a difference in hand moving timing to be made inconspicuous, are provided.

[5] Other Modes of the Present Invention

In a first other mode of the present invention, a control method for an electronic gear for driving a plurality of motors according to electric power supplied from a power supply comprising a magnetic-field detection step of detecting an external magnetic field around the motors; a rotation detection step of detecting the rotations of the motors; an output-timing control step of controlling the output timings of driving pulses for driving the motors, according to at least one of the detection results obtained in the magnetic-field detection step and the rotation detection step, and of controlling such that, in a state in which a power-supply voltage is recovered from a reduced voltage caused by the output of a first driving-pulse signal for driving a first motor, which is one of the motors, a seconds driving-pulse signal for driving a seconds motor, which is another motor, is output within a predetermined period of time, determined in advance, after the output of the first driving-pulse signal; and a driving-pulse output step of outputting the driving-pulse signals to the motors under the control in the output-timing control step is used as a basic mode, and the output-timing control step includes an auxiliary-driving-pulse-signal output control step for controlling so as to output an auxiliary driving pulse signal having a larger effective power than a usual driving pulse signal to a motor in the driving-pulse output step when the motor is not driven by the normal driving pulse signal in the rotation detection step.

A second other mode of the present invention is configured according to the above basic mode such that the output-timing control step includes a motor-rotation-detection disabling step of disabling the detection operation in the rotation detection step when an external magnetic field specified in advance which affects the motor-rotation detection performed in the rotation detection step is detected in the magnetic-field detection control step, and an auxiliary-driving-pulse-signal output control step of controlling so as to output an auxiliary driving-pulse signal which is larger in effective power than the usual driving-pulse signals to the motors in the driving-pulse output step when the detection operation in the motor rotation detection step is disabled.

A third other mode of the present invention is configured according to the above basic mode, the first other mode, or the second other mode such that, in the output-timing control step, the detection result obtained in the rotation detection step, corresponding to one of the plurality of motors, is used as an output-timing control signal for another motor.

A fourth other mode of the present invention is configured according to one of the above basic mode and the first to third other modes such that, in the output-timing control step, the detection result obtained in the magnetic-field detection step, corresponding to one of the plurality of motors, is used as an output-timing control signal for another motor.

A fifth other mode of the present invention is configured according to the above basic mode such that the electronic unit comprises motors for driving hands as the plurality of motors, an electricity accumulating apparatus for accumulating electric power, and time indication means operating with the use of the electric power supplied from the electricity accumulating apparatus and allowing the time to be indicated by the use of the electric power supplied from the electricity accumulating apparatus, and the predetermined period of time is specified as a same-timing-recognition allowing period in which the user recognizes that the hands corresponding to continuously driven motors among the plurality of motors move with almost the same timing.

A sixth other mode of the present invention is configured according to the above fifth other mode such that the same-timing-recognition allowing period is set to 100 msec or less.

A seventh other mode of the present invention is configured according to the above basic mode such that the state in which the power-supply voltage is recovered from a reduced voltage step is a voltage state in which the motors can be driven.

What is claimed is:

1. An electronic unit for driving a plurality of motors using electric power supplied from a power supply, comprising:

a magnetic field detector that detects a state of an external magnetic field around each of the motors;

a rotation detector in communication with each of the motors to detect a rotation state of each of the motors;

an output timing controller that controls, according to at least one of the detection results obtained by the magnetic field detector and the rotation detector, the output timings of pulse signals for driving each of the motors, including a first pulse signal for driving a first one of the motors and a second pulse signal for driving a second one of the motors, wherein the output timing controller controls the pulse signals such that, when the voltage of the power supply has been reduced as a result of the output of the first pulse signal, the second pulse signal is output a predetermined period of time after the output of the first pulse signal, the predetermined period of time being of sufficient length to enable the power supply to recover from its reduced voltage state before the second pulse signal is output; and a pulse output circuit that outputs the pulse signals to the motors under the control of the output timing controller.

2. An electronic unit according to claim 1, wherein the pulse signals include driving pulse signals and auxiliary driving pulse signals, larger in effective power than the driving pulse signals, and the output timing controller includes an auxiliary driving pulse signal output controller that controls the output of each auxiliary driving pulse signal such that, when the rotation detector detects that a particular motor is not rotating in response to a driving pulse signal outputted to that motor, an auxiliary driving pulse signal is output to that motor by the pulse output circuit.

3. An electronic unit according to claim 1, wherein the pulse signals include driving pulse signals and auxiliary driving pulse signals, larger in effective power than the driving pulse signals, and the output timing controller includes a disabling circuit that disables the motor rotation state detection operation of the rotation detector with respect to a particular motor when the magnetic field detector detects an external magnetic field which affects the detection operation of the rotation detector with respect to that motor, and an auxiliary driving pulse signal output controller that controls the output of the auxiliary driving pulse signals such that, when the motor rotation state detection operation of the rotation detector with respect to a particular motor is disabled, an auxiliary driving pulse signal is output to that motor by the pulse output circuit.

4. An electronic unit according to claim 1, wherein the output timing controller uses the detection result obtained by the rotation detector, corresponding to one of the motors, to control the output timing of a pulse signal to another one of the motors.

5. An electronic unit according to claim 1, wherein output timing controller uses the detection result obtained by the magnetic field detector, corresponding to one of the motors, to control the output timing of a pulse signal to another of the motors.

6. An electronic unit according to claim 5, wherein the motors are arranged such that the effects thereon due to the external magnetic field are substantially equivalent.

7. An electronic unit according to claim 6, wherein the motors are positioned substantially parallel to each other.

8. An electronic unit according to claim 6, wherein each motor is positioned within ±60 degrees of each of the other motors, with respect to a parallel position.

9. An electronic unit according to claim 1, further comprising:

an electric power accumulator; and a time measuring device that operates on electric power supplied from the electric power accumulator, and that comprises a time indicator for indicating the time.

10. An electronic unit according to claim 9, wherein the time indicator includes a plurality of hands driven by the motors, and wherein the predetermined period of time is set such that any difference in the movement of the hands is unrecognizable to a user.

11. An electronic unit according to claim 10, wherein the predetermined period of time is less than or equal to 100 msec.

12. An electronic unit according to claim 1, wherein the state in which the power supply voltage is recovered from a reduced voltage is defined as a voltage state in which the motors can be driven.

13. A control method for an electronic unit for driving a plurality of motors using electric power supplied from a power supply, the method comprising:

(a) detecting a state of an external magnetic field around each of the motors;

(b) detecting a state of rotation of each of the motors;

(c) controlling the output timings of pulse signals for driving each of the motors, including a first pulse signal for driving a first one of the motors and a second pulse signal for driving a second one of the motors, according to at least one of the detection results obtained in step (a) and step (b), wherein the output timings of the pulse signals are controlled such that, when the voltage of the power supply has been reduced as a result of the output of the first pulse signal, the second pulse signal is output a predetermined period of time after the output of the first pulse signal, the predetermined period of time being of sufficient length to enable the power supply to recover from its reduced voltage state before the second pulse signal is output; and (d) outputting the pulse signals to the motors according to step (c).

14. A control method according to claim 13, wherein the pulse signals include driving pulse signals and auxiliary driving pulse signals, larger in effective power than the driving pulse signals, and step (c) includes controlling the output of each auxiliary driving pulse signal such that, when it is detected that a particular motor is not rotating in response to a driving pulse signal outputted to that motor, an auxiliary driving pulse signal is output to that motor.

15. A control method according to claim 13, wherein the pulse signals include driving pulse signals and auxiliary driving pulse signals, larger in effective power than the driving pulse signals, and step (c) includes disabling the motor rotation state detecting operation with respect to a particular motor when an external magnetic field is detected which affects the rotation state detecting operation with respect to that motor, and controlling the output of the auxiliary driving pulse signals such that, when motor rotation state detecting operation of with respect to a particular motor is disabled, an auxiliary driving pulse signal is output to that motor.

16. A control method according to claim 13, wherein, in step (c), the detection result obtained in step (b), corresponding to one of the motors, is used to control the output timing of a pulse signal to another one of the motors.

17. A control method according to claim 13, wherein, in step (c), the detection result obtained in step (a), corresponding to one of the motors, is used to control the output timing of a pulse signal to another of the motors.

18. A control method according to claim 13, wherein the predetermined period of time is less than or equal to 100 msec.

19. A control method according to claim 13, wherein the state in which the power supply voltage is recovered from a reduced voltage is defined as a voltage state in which the motors can be driven.

* * * * *